F. O. BOSWELL.
AUTOMOBILE LOCK.
APPLICATION FILED MAR. 30, 1917.
1,263,516.
Patented Apr. 23, 1918.
2 SHEETS—SHEET 1.
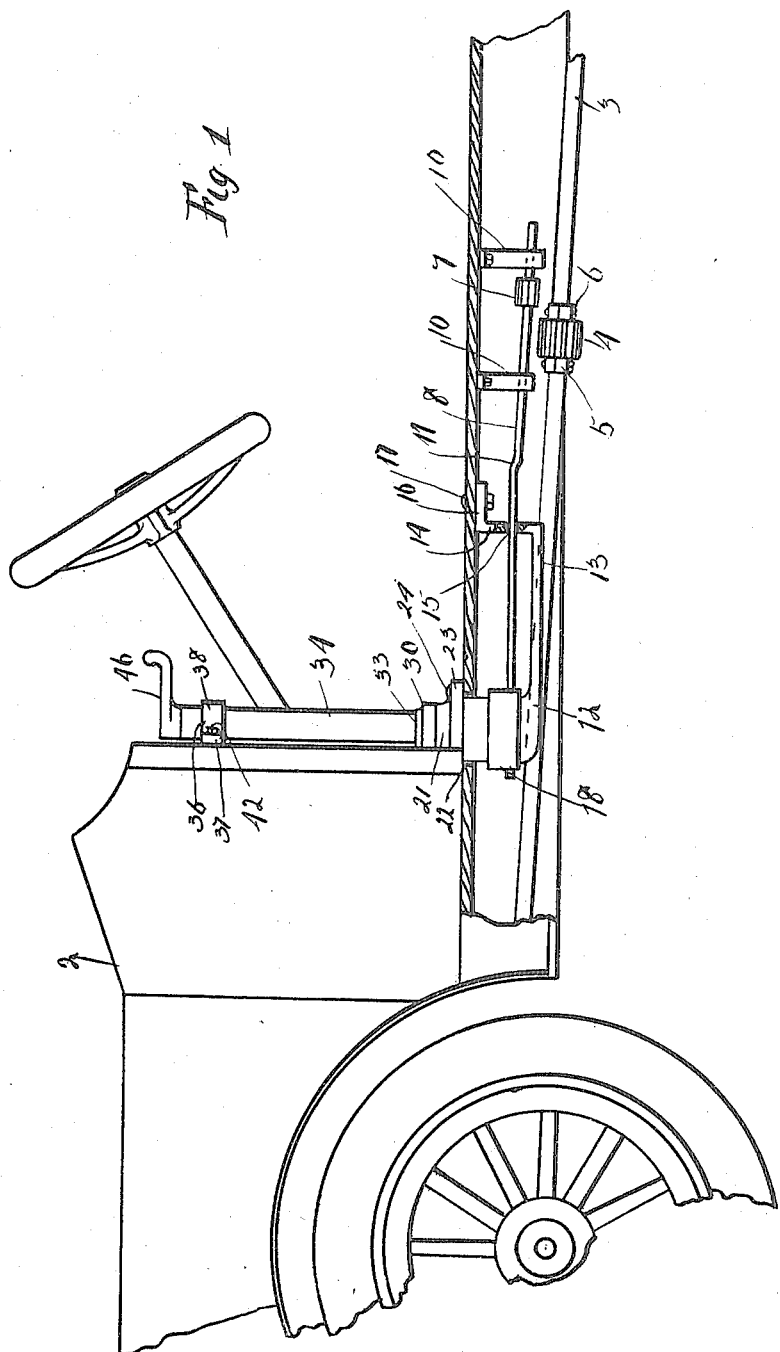
INVENTOR
Fletcher O. Boswell
By W. H. Williamson

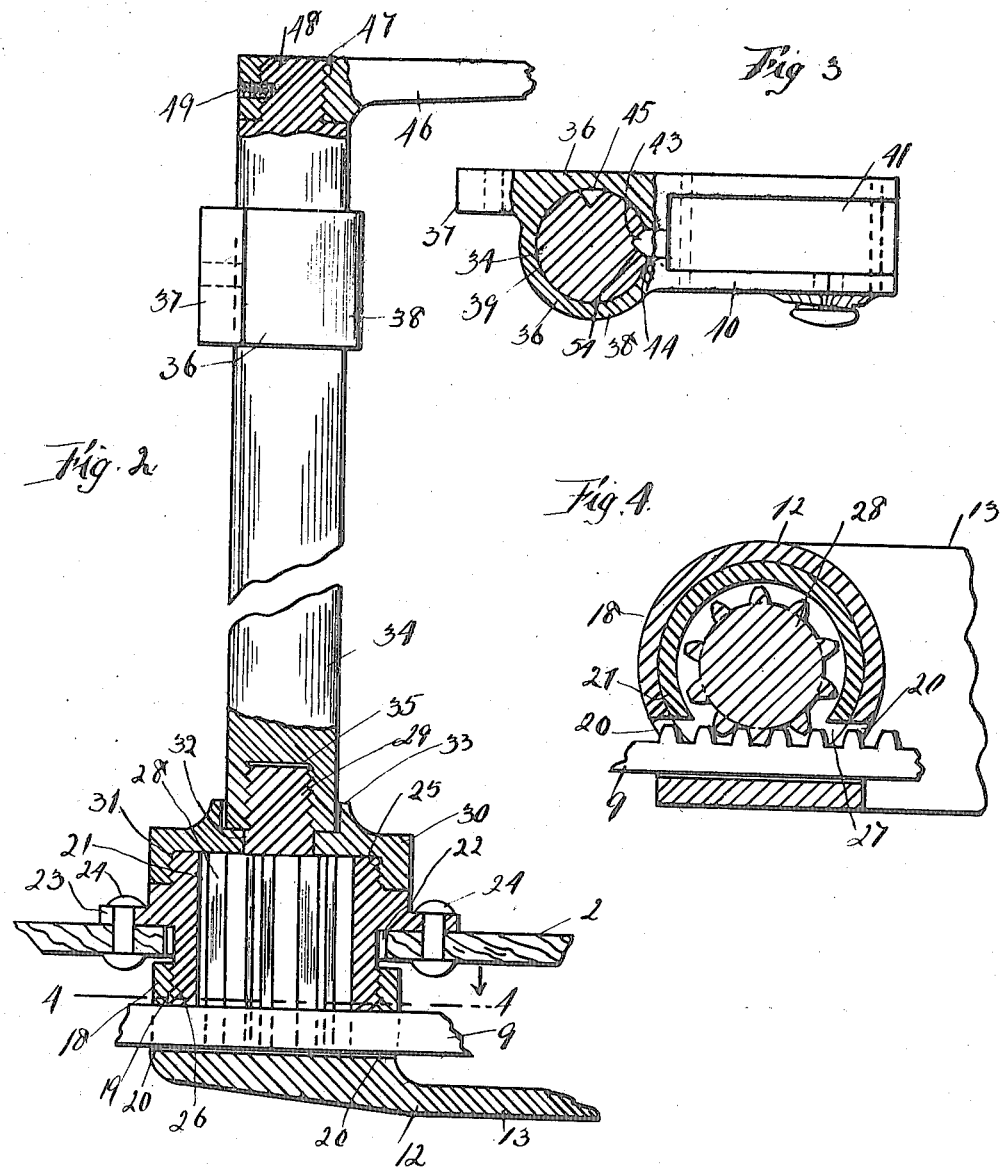

UNITED STATES PATENT OFFICE.

FLETCHER O. BOSWELL, OF PHILADELPHIA, PENNSYLVANIA.

AUTOMOBILE-LOCK.

1,263,516.  Specification of Letters Patent.  Patented Apr. 23, 1918.

Application filed March 30, 1917. Serial No. 158,532.

*To all whom it may concern:*

Be it known that I, FLETCHER O. BOSWELL, a citizen of the United States, residing at Philadelphia, in the county of Philadelphia and State of Pennsylvania, have invented new and useful Improvements in Automobile-Locks, of which the following is a specification.

My invention relates to new and useful improvements in automobile locks, and has for its object to provide an exceedingly simple and effective device of this character, whereby an automobile may be readily and quickly locked by the operator to prevent the unauthorized use or theft thereof.

A further object of the invention is to provide a device of this character which may be readily and quickly applied to an automobile of any construction, whereby the driving shaft may be locked to prevent the engine from being started or the automobile from being pulled along the roadway as by another machine.

A still further object of the invention is to provide a simple means which may be readily applied to the driving shaft having a member arranged to coact therewith, the latter being non-rotatable, so that when it is in engagement with the member on the driving shaft, said driving shaft will be held against rotation, the non-rotatable member being operated by a single and effective means which may be locked in different positions by a combination lock, the combination of which is known only to the authorized users of the automoboile.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a fragmentary side elevation of an automobile, showing my improved automobile lock applied thereto, portions of the automobile and the device being broken away to clearly illustrate the construction and application.

Fig. 2, is an enlarged fragmentary vertical sectional view of a portion of the operating mechanism, some of the parts being shown in elevation.

Fig. 3, is a plan view of the fixture or bracket which acts as a holder for the combination lock and a bearing for the upright post, a portion thereof being broken away and shown in section to illustrate the construction; and Fig. 4, is a section at the line 4—4 of Fig. 2.

In carrying out my invention as here embodied 2 represents an automobile provided with the ordinary and well known drive shaft 3, on which is mounted a split gear 4 having a reduced hub 5 at both ends, through which pass rivets, bolts or their equivalent 6 for rigidly attaching said split gear to the driving shaft. With this gear is adapted to coact a non-rotatable gear or toothed segment 7 mounted upon a rack bar 8 having an integral rack 9 formed on one end thereof. The outer end of this rack bar is slidably mounted in suitable depending brackets 10 secured to the underside of the floor of the automobile or to the chassis, one of which is located beyond each end of the split gear, so as to properly position the toothed segment 7 for proper engagement with the split gear.

As the driving shaft 3 of an automobile is generally arranged in an inclined position, the outer end of the rack bar is bent out of line with the forward end thereof at a point intermediate its length as at 11, so that the rear end of said bar will lie parallel with the driving shaft 3, while the forward end is in a horizontal position or approximately parallel with the floor of the car. Beneath the floor of the car is located a base support or bracket 12 having a body 13 with an upwardly projecting leg 14 provided with an opening 15 and having an arm 16 projecting from its upper end, whereby the base support may be secured to the underside of the floor of the car or to the chassis by means of a rivet, bolt or equivalent 17. At the opposite end of the body, said base support is provided with a socket 18 threaded internally as at 19, and having two holes 20 in the walls thereof at directly opposite points for the passage of the rack bar 8. Into this socket is threaded a sleeve 21 which passes through a hole 22 in the floor of the car, and this sleeve is provided with an external flange 23 intermediate its ends adapted to rest upon the upper face of the floor of the car about the hole 22 and be secured to the floor of the car by means of rivets, bolts or their equivalent 24. The sleeve is threaded externally, both above and below the flange 23 as at 25 and 26 respectively, the threads 26 permitting said sleeve to be threaded into the socket 18 which forms a part of the base bracket 12.

At the lower end of the sleeve 21 is formed a slot 27 for the entrance of the rack teeth into the sleeve 21, within which is rotatably located a rack gear 28 having a threaded stem 29. On the upper or outer end of the sleeve is threaded a cap 30 provided with threads 31 for coöperation with the threads 25. Said cap incloses the rack gear and is provided with a central opening 32 for the passage of the stem 29 and surrounding said opening is an upwardly projecting flange 33 formed integral with the cap and spaced a short distance from the outer circumference of the central opening 32. On the projecting end of the threaded stem 29 is secured the upright post 34 having a threaded socket 35 for registration with the stem 29, and this post is preferably located close to the dash-board or in some suitable region of the car, where it will be out of the way of the operator and still be within easy access when it is desired to lock the car.

To some suitable part of the car, such as the dash-board is secured a bracket 36 having a base 37 and an enlargement 38 intermediate the ends of the base in which is formed a bearing opening 39 for the upright post, and from this enlargement projects an ear 40 running parallel with a portion of the base, and in between this ear and that portion of the base with which it runs parallel, is located the combination lock 41 which is secured in position by the same securing means, such as bolts 42 that fasten the bracket 36 to the dash-board, one of said bolts passing through the base, another passing through the ear, lock casing and base, and the third passing through the lock casing and base.

The lock bolt 43, when the lock is in position is in alinement with an opening 44 in the enlargement 38, and is adapted to register with either of two notches 54 and 45 formed in the upright post 34, so that the device may be locked in either an opened or closed position. On the upper end of the upright post 34 is secured an operating crank handle 46, and one way of placing the same upon the post is to provide the crank handle with a threaded opening 47 for registration with a threaded reduced portion or projection 48, said handle being locked to this reduced portion in any suitable manner as by a set screw 49.

When the automobile is being used by the authorized operator, the parts are in the approximate position shown in Fig. 1, so that the toothed segment 7 is out of engagement with the split gear 4, which will permit the unhindered rotation of the driving shaft 3, and when the parts are in this position, the lock bolt 43 is in registration with the opening 54 in the upright post so as to prevent the accidental movement of the toothed segment 7 which might cause accidents.

When the car is brought to a standstill, and it is desired to lock the same to prevent its unauthorized use or theft, the combination lock is operated to withdraw the lock bolt 43 from the notch 54, after which the upright post 34 may be revolved by the use of the crank handle 46 and the revolving of said upright post will transmit motion through the rack gear 28 to the rack bar 8, causing said rack bar to move longitudinally of the automobile in the proper direction to bring the toothed segment 7 into engagement or mesh with the split gear 4, and as the toothed segment is non-rotatable, the split gear will be held against rotation, thus securely locking the automobile through the medium of the driving shaft 3, on which said split gear is mounted.

When the parts are in the position for bringing the toothed segment 7 into mesh with the split gear 4, the notch 45 in the upright post 34 will be in alinement with the opening 44 in the enlargement 38 and permit the lock bolt 43 to register with said notch 45 and securely lock the parts against their movement by an unauthorized person.

When the parts are so locked, a person unfamiliar with the combination of the lock cannot unlock the same, and it will therefore be impossible to either start the engine or propel the vehicle in any other way along the roadway, and it will be noted that because of the thickness of the parts, it will be very difficult to saw through them, and the smallest part below the combination lock being the threaded stem 29, I have found it advisable to protect this part by the flange 33 which adds considerable thickness of metal, making it very difficult and requiring a considerable length of time to saw through the parts at this point.

Of course I do not wish to be limited to the exact details of construction as here shown, as these may be varied within the limits of the appended claims without departing from the spirit of my invention.

Having thus fully described my invention, what I claim as new and useful, is—

1. In a device of the character stated two coacting locking members, one of which is adapted to be secured to the driving shaft of an automobile, an upright post, said upright post having notches therein, means for transmitting motion from the upright post to the other coacting member, a bracket in which said upright post is journaled, said bracket being so located as to cover the notches in the upright post and a lock carried by said bracket and provided with a lock bolt for registration with said notches at certain times for the purpose specified.

2. In a device of the character stated, the combination with an automobile having a driving shaft, of a gear mounted on said shaft and revolving therewith, a pair of depending brackets secured to the under side of the automobile floor in the region of the gear, a bar slidably mounted in said brackets, a toothed member carried by said bar and adapted to be moved into and out of engagement with the gear, a rack on the other end of said bar, a rack gear meshing therewith, an upright connected with said gear for rotating the same and a combination lock for locking said upright.

3. The combination with an automobile having a drive shaft with a locking element thereon, of a base support provided with a socket at one end and having means at its other end, whereby the same may be fastened to the floor of the automobile, a rack bar carrying another locking element, the latter adapted to coöperate with the first named locking element, said rack bar passing through the socket of the base support, a sleeve detachably secured to said socket and having means for securing the same to the floor of the automobile, a rack gear rotatably mounted in the sleeve and meshing with the rack bar for actuating the latter and means for rotating said rack gear.

4. In the device of the character stated two coacting locking members one of which is adapted to be secured to the drive shaft of an automobile and the other carried by a bar having a rack at one end, an upright post, a rack gear carried by the lower end thereof and meshing with the rack, whereby one of the locking members may be moved into or out of engagement with the other locking member, when the upright post is rotated, a sleeve passing through the floor of the automobile and having a flange adapted to rest on the automobile floor to be secured thereto, said sleeve housing the rack gear, a base support provided with a socket into which the rack gear projects, said base support being detachably secured to the lower end of the sleeve and having means for attaching the same to the under side of the automobile floor and a cap detachably secured to the upper end of the sleeve for closing the upper end of the sleeve and housing the lower end of the upright post.

In testimony whereof, I have hereunto affixed my signature.

FLETCHER O. BOSWELL.